March 24, 1936.  B. E. VAN ALSTYNE  2,034,929
COPY HOLDER
Filed March 24, 1934    2 Sheets-Sheet 1
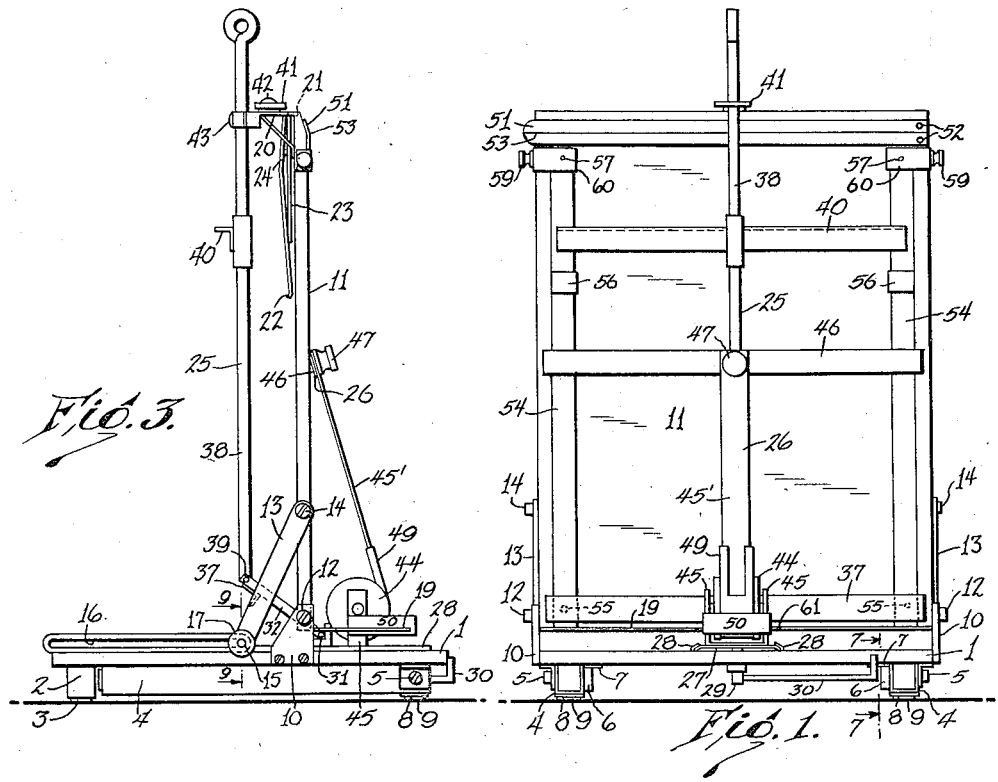
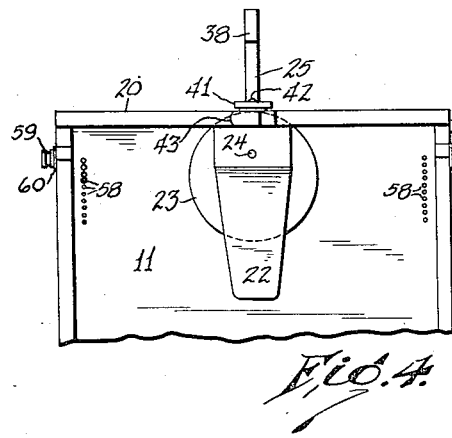
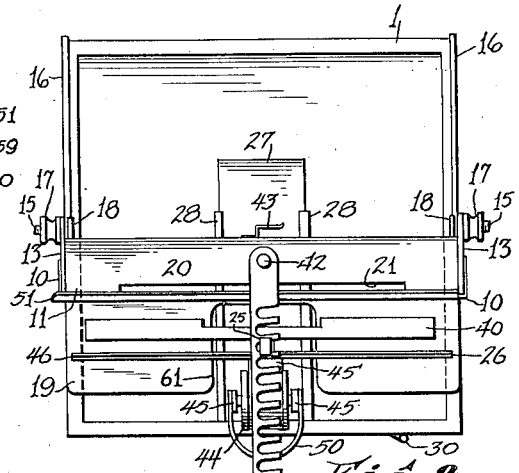
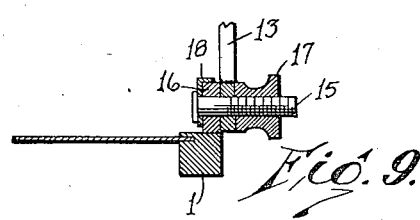
INVENTOR.
BONNIE E. VAN ALSTYNE
BY
Munn, Anderson & Liddy
ATTORNEYS.

March 24, 1936.   B. E. VAN ALSTYNE   2,034,929
COPY HOLDER
Filed March 24, 1934   2 Sheets-Sheet 2
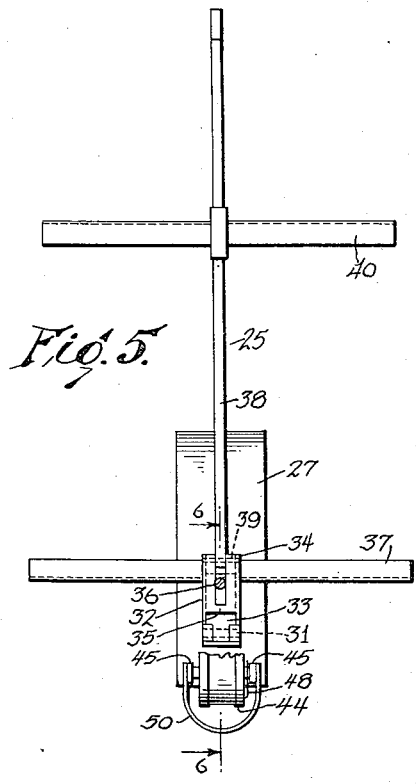
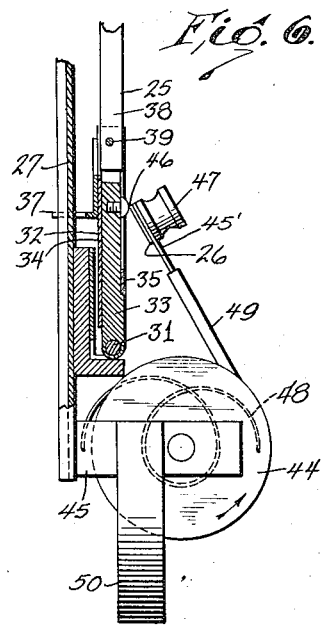
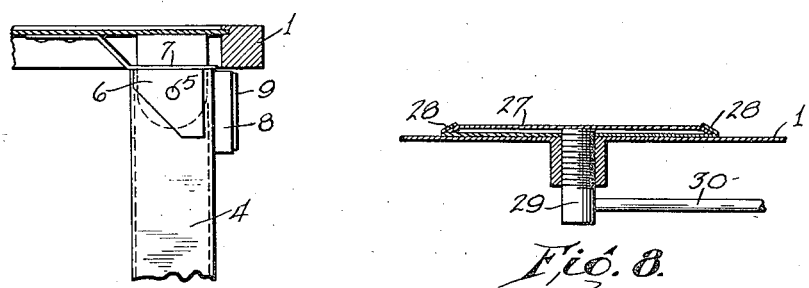
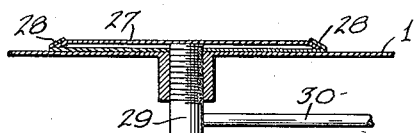
INVENTOR.
BONNIE E. VAN ALSTYNE
BY Munn, Anderson & Liddy
ATTORNEYS.

Patented Mar. 24, 1936

2,034,929

UNITED STATES PATENT OFFICE 2,034,929

COPY HOLDER

Bonnie E. Van Alstyne, San Francisco, Calif.

Application March 24, 1934, Serial No. 717,245

6 Claims. (Cl. 120—28)

The present invention relates to improvements in copy holders and its principal object is to provide a simplified copy holder that will serve the three purposes of supporting an endwise opening note book and a sidewise opening book, and a block of sheets in convenient reading position for copying. Improvements of this character have been described in my Patents No. 1,903,523 granted April 11, 1933, No. 1,908,874 granted May 16, 1933, No. 1,950,706, granted March 13, 1934, No. 1,969,916, granted August 14, 1933, and No. 1,990,103, granted February 5, 1935. It is the purpose in the present invention to simplify the mechanism of the copy holder principally by bringing several active members of the organization into a unitary structure.

More particularly it is proposed in the present invention to provide a rack or holding means for a sidewise opening book and mounting means for the same arranged in such a manner that the rack may be easily changed from active to inactive position.

It is further proposed in the present invention to provide improvements in connection with the leg support for a copy holder. It is a further object of the invention to provide improved means for holding copy to the copy holder and for arranging the copy relative to the holder so that a smooth surface is presented to the person copying from the reading matter disposed on the copy holder.

Further objects and advantages of my invention will appear as the specification proceeds.

The preferred form of my invention is illustrated in the accompanying drawings in which Figure 1 shows a front view of my improved copy holder with the holding rack and the line indicator in active position;

Figure 2 a top plan view of the same copy holder;

Figure 3 a side elevation of the copy holder showing the rack in inactive position behind the copy supporting element;

Figure 4 a rear view of the upper portion of the copy holder;

Figure 5 a plan view of a slide having the rack and the line indicator mounted thereon, a portion of the line indicator being removed;

Figure 6 a vertical section taken along line 6—6 of Figure 5;

Figure 7 a fragmentary section taken along line 7—7 of Figure 1;

Figure 8 a sectional detail view of a locking means for the slide; and

Figure 9 a section taken along line 9—9 of Figure 3.

While I have shown only the preferred form of the invention I wish to have it understood that various changes or modifications may be made within the scope of the claims hereto attached without departing from the spirit of the invention.

My improved copy holder comprises a preferably rectangular base 1 which may be supported by means of two short rear legs 2 having cushioning members 3 projecting therefrom, and two long front legs 4 pivoted near the front edge as shown at 5 and adapted to be swung from the horizontal position shown in Figure 3 to a vertical position in case these legs are required to support the front portion of the copy holder over the cavity in the desk in which the typewriter rests. Each of the long legs as illustrated in Figure 7 has a cam 6 secured to the side thereof adjacent the pivot and this cam cooperates with a spring 7 disposed underneath the base in holding the leg either in vertical or in horizontal position. Each leg 4 also has a projection 8 with a cushion 9 projecting from the front face thereof, the projection added to the thickness of the leg, forming a short leg corresponding to the length of the short rear legs when the long legs 4 are in inactive position.

The base 1 has two brackets 10 rising from opposite side edges thereof, and a supporting plate 11 for the copy to be used is pivoted as at 12 between the two brackets in spaced relation to the base and is adapted to be adjusted to any desired angularity by means of two braces 13 pivoted to the edges of the plate 11 as at 14, and adjustably secured to the side edges of the base 1 by a flattened bolt 15 extending through slotted guides 16, the lower end of the brace passing over the bolt and being held thereto by means of a nut 17. The head of the bolt lies flat against the inner face of the slotted member 16 and has a flange 18 riding on top of the slotted member.

The plate 11 has a flange 19 projecting forwardly from the lower edge thereof for supporting a book placed on the plate 11 and has a second flange 20 projecting rearwardly from the upper edge, a slot 21 being formed in the flange adjacent the plate so as to allow one cover of a note book to be passed therethrough, and to lie in adjacent relation to the rear face of the plate 11 to which it is held by means of a leaf spring 22 shown in detail in Figure 4. When a note book is supported in this manner its other cover will lie against the front face of the plate 11 and in normal use a number of leaves of the note book will overlie the front face of the plate 11, while a plurality of other leaves will be turned backward over the flange 20. If the number of leaves turned backward exceeds the number of leaves disposed on the plate 11, the combined weight of the overhanging leaves has a tendency to cause the leaves to be copied from to bulge outward into a position where the copy is difficult to read, and to avoid this inconvenience I provide an eccentric disc 23 pivoted at 24 near the upper edge of the plate 11, and adapted to be projected above the upper edge to any desired extent by a turning movement whereby the overhanging leaves are raised and the suspended leaves lying against the plate 11 are flattened.

A holding rack 25 and a line indicator 26 are supported in a common slide 27, which latter comprises a substantially rectangular plate received between two small channels 28 secured to the surface of the base which are mounted in such a manner as to allow the slide to move forward and backward to any desired extent. The slide may be locked in place by means of a screw 29, see Figure 8, adapted to bear against the bottom face of the slide and adapted to be operated by a manipulating element 30 having its free end projecting beyond the front edge of the base, the threads of the screw 29 being arranged so that the slide is free to move when the manipulating element 30 is thrown to the left from the position shown in Figure 1, while it is locked against movement when the element 30 is thrown back into the position shown in Figure 1.

The slide 27 has the rack 25 pivoted thereto as shown at 31 and the rack comprises an extensible section 32 including a hinge strap 33 and a channel-shaped member 34 slidable thereon, the sliding movement being limited by a cross piece 35 striking a screw 36 rising from the hinge member. The channel-shaped element has a cross member 37 secured thereto, and this cross member is in the form of an angle and is intended to lie against the bottom edge of the leaves of a sidewise opening book for holding the same against sagging. The channel-shaped member also has a bar 38 pivoted thereto as at 39, and this bar which is intended to overlie the hinge of the sidewise opening book has a second cross member 40 slidable thereon, the second member being also in the shape of an angle and being intended to overlie the upper edge of the leaves of an open book so that the two cross members 37 and 40 cooperate in holding the reading pages of the book to be copied from in perfect position.

It will be noted that the rack 25 for holding a sidewise opening book in position and comprising the hinge strap 33, the channel-shaped member 34, the bar 38, and the cross members 37 and 40, may be arranged at any angularity relative to the slide 27. When the rack is intended to be used it will of course be placed over the front face of the book, and in that case it will be held in position by means of a toothed bar 41 pivoted to the upper flange 20 as at 42, see Figure 2. If it is not desired to use the rack, as for instance when an ordinary note book is to be copied from, the slide 27 may be pulled forward and disconnected from the base whereupon the rack may be swung into the horizontal position indicated in Figure 5, and the free end of the rack be guided through the space between the plate 11 and the base until the front edge of the slide 27 engages with its guideway, whereupon the slide may be advanced in its guideway so as to cause the major portion of the rack to be disposed rearwardly of the plate 11. The rack may then be turned upward on the two hinges 31 and 39, whereby the major portion of the rack is brought into parallel relation to the rear face of the plate 11 as shown in Figure 3, in which position it may be held by means of a clip 43 projecting from the rear edge of the flange, the clip being in the form of an angle into which the bar may be slipped by a sidewise movement.

The slide 27 also serves as a support for the line indicator, which includes preferably a cylindrical housing 44 pivoted between brackets 45 rising from the slide forwardly of the rack mounting and having a steel tape 45' of conventional construction retractable therein so that any desired portion of the steel tape may be made to project from the housing, the steel tape being dished in a well-known manner to give a certain degree of stiffness to the same. The free end of the steel tape is provided with a cross member 46, which serves as line indicator, and a head 47 is preferably provided to facilitate manipulation of the line indicator. The housing 44 is actuated by a spring 48 to urge the line indicator 46 into contact with the copy lying against the plate 11. The steel tape is suitably guided in a fixed channel 49 projecting from the housing through a short distance, and the rotary movement of the housing against the spring is positively limited by the bail 50 projecting forwardly from the brackets between which the housing is supported.

Adjacent the upper edge of the plate I provide a spring leaf 51 riveted to an edge portion as at 52 so as to extend throughout the width of the plate and adapted to clamp a stack of sheets to the upper edge of the plate 11. The latter plate is preferably made to present an angle as at 53 near its upper edge and the leaf spring 51 is also made angular in cross section for improving its clamping action.

The operation of my device will be readily understood from the foregoing description. For positioning the copy holder the legs 4 may be swung backward if the copy holder is to rest on a level surface, or they may be swung downward if the front portion of the copy holder is to rest over the typewriter cavity in the desk. In this latter position, the base is inclined slightly so that its rear edge will be lower than its front edge. The plate 11 may be raised to any desired angularity. If an ordinary sidewise opening book is to be copied from the latter is made to rest against the plate 11 with the bottom edge resting on the flange 19. The rack is arranged to be in front of the plate 11 as shown in Figure 1, and the bottom cross member 37 may be slightly lowered or raised so as to lie over the bottom edges of the uppermost leaves of the open book. The bar 25 is arranged to overlie the hinge of the book and the cross member 40 is moved so as to lie over the upper edges of the uppermost leaves of the book. The upper end of the bar 38 is engaged with the toothed bar 41 and the latter engagement, as well as the position of the slide 27, may be adjusted so that the rack firmly holds the upper leaves of the book in place. The line indicator may be pulled upward to any place desired so as to be underneath the line which is to be copied. If the book is opened in such a manner that one side is much heavier than the other, the latter side may be raised by means of one of the two leaf springs 54 anchored at their lower ends as at 55, and guided intermediate their length in guides 56, while the free ends may be adjusted to any desired position by means of pins 57 engageable with any one of a plurality of holes 58. The upper ends may be manipulated by means of a head 59 projecting laterally from short clips 60 extending sidewise from the spring leaves.

If an ordinary note book is to be copied from the slide 27 is first withdrawn from the platform and the rack arranged to lie flat on the slide as shown in Figure 5. The end of the rack is then passed through the opening between the plate 11 and the base until the slide 27 engages its guide 28, whereupon the slide is advanced until the rack may be lifted and locked in its inactive position as shown in Figure 3. One cover of the note book may then be introduced through the slot 21 so as to lie flat against the rear face of the plate 11, upon which it is clamped by the spring 22, while the other cover may be made to drop against the front face of the plate 11 and the book opened to allow some leaves to lie against the front face of the plate 11, while other leaves are turned back over the flange 20. The line indicator may then be raised to lie against the front face of the page to be copied from, and may be suitably lowered from line to line as the copying proceeds. The flange 19 is provided with a recess 61 to accommodate the lower portion of the rack and the housing for the steel tape in case the copy to be accommodated is comparatively thin, and the slide has to be pushed inward to cause a proper fit.

If the copy consists merely of a stack of sheets the upper edges of the same may be clamped underneath the spring 51, and the line indicator may be used in the manner previously described, while the rack is placed in inactive position.

When the front legs 4 are extended and project down into the cavity of the desk the base 1 is inclined in the manner already described and this will leave a space between the rear of the typewriter and the front edge of the base. This space permits the extended portion of the sheet being typed, to be passed down between the typewriter and the base instead of extending over the top of the base.

A further advantage of the extended legs 4 is that they will extend into the desk cavity provided for the typewriter and will support the base of the copyholder substantially in line with the top of the typewriter. This will permit the entire copy to be viewed and will give the operator easy access to adjust the line indicator and to adjust the slide 27 and lock it against movement by the screw 29.

I claim:
1. In a copy holder, a base, a copy supporting element supported thereon in angular position and legs pivoted to the base having means for yieldingly holding the same in active and inactive positions.

2. In a copy holder, a base, a copy supporting element supported thereon in angular position, legs pivoted to the base and having cams at the pivots and spring elements secured to the base and coacting with the cams for yieldingly holding the legs in active and in inactive positions.

3. A copy holder comprising a base, a copy holding member pivotally supported by the base, short legs secured to the rear of the base, long legs pivotally secured to the front of the base, said long legs having projections designed to cooperate with the rear legs in supporting the base when the long legs are in folded position.

4. A copy holder comprising a base, a copy holding member pivotally supported by the base, short legs secured to the rear of the base, long legs pivotally secured to the front of the base, said long legs having projections designed to cooperate with the rear legs in supporting the base when the long legs are in folded position, and spring means for yieldingly holding the long legs in extended or folded position.

5. A copy holder comprising a base, a copy holding member pivotally supported by the base, short legs secured to the rear of the base, long legs pivotally secured to the front of the base, said long legs having projections designed to cooperate with the rear legs in supporting the base when the long legs are in folded position, said copy holding member being spaced from the front edge of the base and means for adjustably supporting the copy holder in angular position with respect to the base.

6. A copy holder comprising a base, a copy holding member pivotally supported by the base, the point of pivot being spaced rearwardly from the front edge of the base, short legs secured to the rear of the base, long legs pivotally secured to the front of the base, said long legs when extended into operative position being receivable in the cavity formed in the top of a typewriter desk, the long and short legs supporting the base in an inclined position so that the front edge of the base is disposed at a higher level than the rear edge whereby a space is provided between the front edge of the base and the rear of the typewriter for receiving the projecting portions of the sheets extending from the typewriter.

BONNIE E. VAN ALSTYNE.